No. 830,649. PATENTED SEPT. 11, 1906.
C. DENNIS.
BOILER TRAP.
APPLICATION FILED FEB. 21, 1906.
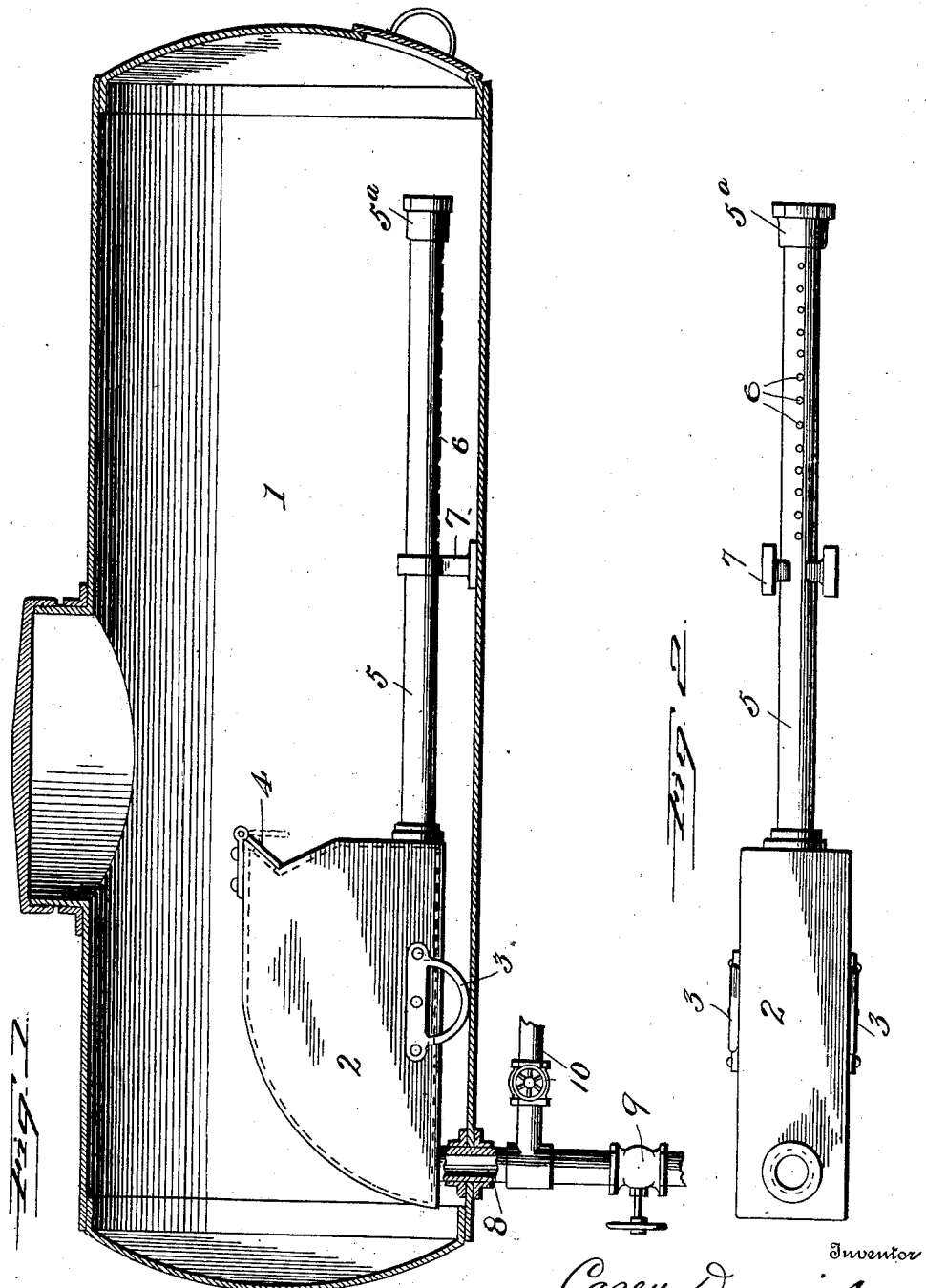

UNITED STATES PATENT OFFICE.

CAREY DENNIS, OF CARTHAGE, MISSOURI, ASSIGNOR OF ONE-EIGHTH TO NIAL WAGNER, ONE-FOURTH TO GEORGE E. SHIRLEY, AND ONE-EIGHTH TO WILLIAM V. HATTEN, OF CARTHAGE, MISSOURI.

BOILER-TRAP.

No. 830,649.　　　Specification of Letters Patent.　　　Patented Sept. 11, 1906.

Application filed February 21, 1906. Serial No. 302,263.

*To all whom it may concern:*

Be it known that I, CAREY DENNIS, a citizen of the United States, and a resident of Carthage, Missouri, (whose post-office address is Carthage, Missouri,) have invented a new and useful Boiler-Trap, of which the following is a specification.

My invention relates to a trap to be placed in steam-boilers, feed-water heaters, or other similar apparatus for the purpose of removing mud or other sediment therefrom.

In the accompanying drawings, which illustrate an exemplification of my invention, Figure 1 is a side elevation of the trap in place in a boiler, and Fig. 2 is a bottom view of the trap.

A represents the casing or shell of a boiler, feed-water heater, or other similar vessel. The trap 1 has parallel sides, and its edge walls are perpendicular to the sides. The bottom is flat and longitudinally placed. The end nearest the supply-pipe is rounded off into the top. The exact shape of the trap may, however, be considerably varied. Two supports 3 are secured to the trap and rest on the bottom of the shell, being preferably not connected thereto, so as to permit of slight movement in contraction and expansion.

At the top of the trap is a check-valve 4, in the present instance a flap-valve, although any other suitable valve may be employed. This opens outward. Communicating with the bottom of the trap is a sediment-pipe 5, extending horizontally near the bottom of the shell. It is provided at the bottom with a series of perforations made in any suitable shape or disposition, and is supported upon the bottom of the chamber by feet 7, which are preferably not secured to the bottom of the shell, but rest thereon so that they may have a sliding movement. A supply-pipe 8 passes through the shell and communicates with the trap at the bottom near the curved portion and is provided with a valve 9 to regulate the admission of water to the shell. A waste-pipe 10 also communicates with pipe 8, or in some instances may communicate directly with the trap, and is provided with a valve 11.

The operation of the device is as follows: Water is normally admitted to the shell through a valve 9 and pipe 8, passing into the trap 2, where it strikes the curved part of the trap and naturally passes around the curve and out through the check-valve 4 into the shell. The valve prevents return of the water through that portion of the shell. Part of the mud or sediment in the water will settle directly in the trap, and the other portion of the sediment will settle at the bottom of the shell and in the sediment-pipe 5. At certain intervals the supply-valve 9 is closed and the discharge-valve 11 opened, whereupon by reason of gravity or the pressure within the shell, or both, water is forced through the perforations made in the sediment-pipe 5, forcing sediment from the bottom of the shell through the said perforations and also forcing the sediment in the pipe and the trap out through the trap, pipe 8, discharge-pipe 10, and valve 11.

It will be noticed that the water in its course through the trap and into the shell naturally tends to keep a clear passage and that being admitted into the shell at a considerable distance above the point at which the sediment naturally accumulates there is no disturbance of the sediment by the incoming fluid.

I contemplate any variations in the details of the construction shown which do not depart from the spirit of my invention.

What I claim is—

1. In a boiler, feed-water heater, or the like, a shell, a trap within the shell, a sediment-pipe entering the trap near its bottom, having perforations in its under side, and extending approximately horizontally near the bottom of the shell, a supply-pipe communicating with the trap at the bottom and near the end opposite the sediment-pipe, a supply-valve in the supply-pipe, a discharge-valve communicating with said supply-pipe, and a passage in a part of the trap considerably above the sediment-pipe for admitting water to the shell.

2. In a boiler, feed-water heater or the like, a shell, a trap within the shell, a sediment-pipe entering the trap near its bottom, having perforations in its under side, and extending approximately horizontally near the bottom of the shell, a supply-pipe communicating with the trap at the bottom and near the end opposite the sediment-pipe, a supply-valve in the supply-pipe, a discharge-valve communicating with said supply-pipe and a check-valve in a part of the trap considerably above the sediment-pipe for admitting water to the shell but preventing return of the water from the shell through said valve.

3. In a boiler or the like, a shell, a trap near the bottom of the shell, a perforated sediment-pipe communicating with the trap, a supply-pipe communicating with the trap, a supply-valve in the supply-pipe, a discharge-valve communicating with said supply-pipe, and a check-valve in the upper part of the trap for admitting water to the shell.

In testimony whereof I have affixed my signature in the presence of two witnesses.

CAREY DENNIS.

Witnesses:
H. T. HARRISON,
J. A. M. LEAN.